Patented June 10, 1941

2,244,702

UNITED STATES PATENT OFFICE

2,244,702

METHACRYLATE POLYMERIZATION PRODUCTS

Leo P. Hubbuch, Springfield, Pa., assignor to E. I. du Pont de Nemours & Company, Wilmington, Del., a corporation of Delaware No Drawing. Application April 16, 1938, Serial No. 202,470

12 Claims. (Cl. 260—84)

This invention relates to methacrylate polymerization products and, more particularly, to the preparation of such polymerized products adapted for use as molding compounds.

Heretofore, polymerized esters of methacrylic acid have been prepared and used as molding compounds. Polymerized methyl methacrylate has proven outstandingly suited for this purpose but this polymer, and other polymerized monohydric alcohol esters of methacrylic acid to an even greater extent, all of which are thermoplastic in nature, have softening points low enough to exclude them from certain uses. By special methods of preparation the softening point of polymerized methyl methacrylate can be raised somewhat but the use of such special methods is not always practical or economical. There is a definite need in the art for a molding compound having the favorable properties of polymerized methyl methacrylate but a somewhat higher softening temperature.

An object of the present invention is to provide new polymerized resins adapted for use as molding compounds. A further object is to provide new polymerized resins which can be prepared readily and economically. A further object is to provide a method of modifying methacrylate polymers to give modified resins retaining the favorable properties of the methacrylate polymers but possessing higher softening points. A still further object is to provide new interpolymers suitable for use as molding compounds. Other objects of the invention will be apparent from the description given hereinafter.

The above objects are accomplished according to the present invention by subjecting to polymerizing conditions a mixture of methacrylic acid and a monohydric alcohol ester of methacrylic acid to form an interpolymer in which the methacrylic acid comprises approximately 5-33%, by weight, of the interpolymer. Alternatively expressed, there is polymerized a mixture of one part of methacrylic acid and approximately 2-20 parts of a monohydric alcohol ester of methacrylic acid. More specifically, it is preferred to form an interpolymer in which the methacrylic acid component comprises 10-20%, by weight, of the interpolymer, that is, an interpolymer obtained by polymerizing a mixture of one part of methacrylic acid and 4-9 parts of a methacrylic acid ester. The methyl alcohol ester of methacrylic acid, e. g., methyl methacrylate, is the preferred ester for use in the present invention.

It has been discovered that by interpolymerizing the monohydric alcohol esters of methacrylic acid with methacrylic acid valuable thermoplastic resins of higher softening point than ordinarily possessed by the corresponding polymerized methacrylate ester per se, are obtained without the need of resorting to any special polymerization procedure. As the proportion of methacrylic acid is increased, the softening temperature of the resulting interpolymer becomes higher. Further, it has been found that a proportion of less than one part, by weight, of methacrylic acid to 20 parts of the methacrylic acid ester, does not effect a sufficient increase in softening temperature to be of any real value while more than one part, by weight, of methacrylic acid, to 2 parts of the methacrylic acid ester, is undesirable as the resulting interpolymer tends to have too high a softening point to be readily adaptable to ordinary molding technique and, further, tends to be too water-sensitive.

The following examples, wherein parts are given by weight unless otherwise stated, illustrate specific embodiments of the present invention:

*Example I.*—An aqueous vehicle "A" was made up of:

| | Parts |
|---|---|
| Distilled water | 3,834 |
| 1% aqueous solution of methyl starch | 166 |

Into this vehicle "A" was stirred a mixture of "B" consisting of:

| | Parts |
|---|---|
| 80% methyl methacrylate, 20% methacrylic acid | 1,960 |
| Mixture of straight chain aliphatic alcohols of 16, 17 and 18 carbon atoms to serve as mold lubricant | 40 |
| Benzoyl peroxide | 15.7 |

The combined liquids "A" and "B" were introduced with stirring into a vessel equipped with a reflux condenser and an anchor agitator and were stirred by the agitator running at 850 R. P. M. while being heated to a refluxing temperature of 82° C. The agitation kept the liquid "B" suspended in droplets in the aqueous vehicle "A." After 30 minutes of refluxing, the droplets "B" had become polymerized to very small solid globules. These globules of interpolymer were separated by decantation, washed three times in distilled water and dried at 70° C. for 20 hours.

The dried interpolymer thus obtained was molded into strips and the softening temperature of the polymer determined as follows: A strip of interpolymer 0.050" x 2.5" x 0.5" was clamped with its length in horizontal position and its width in vertical position, the clamp occupying 0.25" of the length of the strip at one end. At a distance of 0.25" from the other end there was applied to the upper edge of the test piece, vertically from above, a weight of 11 grams which thus applied a distorting moment at a distance of 2" from the point of support. The test piece was heated from room temperature at a rate of 3° C. per minute by immersion in an oil bath and the softening temperature was taken as that temperature at which the weighted end of the strip had become depressed by 0.060".

As measured by the above test, the interpolymer prepared above showed a softening temperature of 114° C.

Following the procedure of Example I but using varying proportions of methacrylic acid and methyl methacrylate, the following results were obtained:

| Methyl methacrylate | Methacrylic acid | Softening temperature |
|---|---|---|
| | | °C. |
| 100 | 0 | 93 |
| 90 | 10 | 104 |
| 70 | 30 | 126 |

*Example II.*—A solution made up of:

| | Parts |
|---|---|
| Methyl methacrylate monomer | 150 |
| Methacrylic acid monomer | 50 |
| Toluene | 1,500 |
| Benzoyl peroxide | 2 | was heated for 5 hours on a steam bath in a flask fitted with a reflux condenser. Polymerization was apparently substantially complete at the end of the first hour of the heating period. The interpolymer separated from the solution as it was formed. At the end of the 5 hour period the polymer was separated from the toluene by filtration and purified by washing with toluene, then air dried at room temperature and oven dried for 24 hours at 65° C. An interpolymer was thus obtained in a finely divided form suitable for use as a molding powder.

*Example III.*—A solution of 475 parts of methyl methacrylate, 25 parts of methacrylic acid and 5 parts of benzoyl peroxide was added to a solution of 1.5 parts of methyl starch in 1000 parts of water, at 70° C. The batch was stirred repeatedly with an agitator during the addition of the mixed monomers and until polymerization was completed. After the addition of the mixed monomers, the temperature of the monomer-water dispersion was rapidly increased to its refluxing temperature, i. e., about 82° C. and was held at that temperature until active polymerization occurred which was evidenced by a rapid increase in the refluxing temperature to about 95° C. This increase in temperature was observed about 45 minutes after the addition of the mixed monomers to the aqueous vehicle. The interpolymer obtained was in the form of fine white granules which were washed thoroughly with water and dried for 16 hours at 80° C., a yield of 483 parts of dried interpolymer being obtained.

Compression molding of 7.5 grams of this interpolymer in a disc mold of 2" diameter, at a temperature of 170° C. and a pressure of 2000 pounds per square inch gave a disc which was transparent and tough and had a softening temperature of about 98° C.

*Example IV.*—A solution made of:

| | Parts |
|---|---|
| Propyl methacrylate monomer | 180 |
| Methacrylic acid monomer | 20 |
| Toluene | 800 |
| Benzoyl peroxide | 4 | in a flask fitted with a reflux condenser was heated for 1.5 hours on a steam bath, the batch separating into two layers during the heating. The complete batch was then transferred to a flat tray and heated for 72 hours at 100° C. to drive off the toluene. The interpolymer remaining in the tray was ground to a powder which was soluble in methanol, acetone, ethyl acetate, and dioxan but insoluble in toluene and gasoline.

*Example V.*—A solution made of:

| | Parts |
|---|---|
| Propyl methacrylate monomer | 140 |
| Methacrylic acid monomer | 60 |
| Toluene | 800 |
| Benzoyl peroxide | 4 | in a flask with a reflux condenser was heated on a steam bath for 1.5 hours. Thereafter, the complete batch was transferred to a tray and heated for 72 hours at 100° C. to drive off the toluene as in the preceding example. The interpolymer recovered was soluble in methanol and dioxan but insoluble in toluene, acetone, ethyl acetate, and gasoline.

*Example VI.*—A solution made of:

| | Parts |
|---|---|
| Octyl methacrylate monomer | 225 |
| Methacrylic acid monomer | 75 |
| Toluene | 1200 |
| Benzoyl peroxide | 3 | in a flask fitted with a reflux condenser was heated 4 hours on a steam bath. Polymerization was essentially complete at the end of the first hour of this heating period. The interpolymer which precipitated from the solution was removed by filtration, washed with toluene, air dried and then oven dried at 80° C. for 8 hours. The resulting interpolymer was soluble in 95% alcohol. Films and moldings made of this interpolymer were hard and non-tacky at 80° C. whereas unmodified octyl methacrylate polymer is a viscous liquid even at ordinary temperatures.

It will be understood that the above examples are merely illustrative and that the present invention broadly comprises the polymerization of a mixture of methacrylic acid and one or more monohydric alcohol esters of methacrylic acid to produce an interpolymer in which the methacrylic acid comprises approximately 5–33%, by weight, of the interpolymer.

The invention is not restricted to any particular method of polymerizing the mixture of methacrylic acid and methacrylate ester, any of the heretofore known methods of polymerizing methacrylate esters being suited for the purpose. For the preparation of molding compounds, however, for which the herein considered interpolymers are especially useful, those polymerization processes which are most economical and practical for preparing polymers in a finely divided form, would normally be used. That is, the polymerization of emulsions or solutions of monomer, as illustrated in the examples, would be more practical to use.

The interpolymers of the present invention are, nevertheless, useful wherever a polymer of increased softening temperature is advantageous and polymerization of the mixtures of methacrylic acid and esters of methacrylic acid in the absence of solvents or an aqueous vehicle, to obtain massive interpolymers, is not excluded.

The invention is applicable to monohydric alcohol esters of methacrylic acid. It will be apparent to those skilled in the art that either a single monohydric alcohol ester of methacrylic acid may be employed or a mixture or two or more of such esters. Methacrylic acid is always employed as one component of the mixture to be polymerized.

The proportion of methacrylic acid in the mixture to be polymerized should be such that it will comprise approximately 5–33%, by weight, of the interpolymer to be formed and it has been found that it is preferable to restrict the methacrylic acid component to 10–20%, by weight, of the interpolymer.

Those skilled in the art will understand that polymerization of the herein considered mixtures may be carried out in the presence of modifying agents such as mold lubricants, plasticizers, coloring matter, and/or various effect materials, or such modifying agents may be incorporated in the interpolymer subsequent to polymerization, to obtain a plastic of desired specific properties.

An advantage of the present invention is that it provides a practical means of obtaining polymers of increased softening temperature. It is an important factor in the value of this invention that the interpolymers of the present invention, if the proportion of methacrylic acid is kept within the limits specified, has a substantially higher softening temperature than that of the corresponding methacrylate ester employed while, at the same time, the introduction of the methacrylic acid into the macromolecule does not impair appreciably the properties of the straight polymerized methacrylate esters which make them valuable commercially as plastics. Some diminution in toughness and some loss of water resistance can be detected as the proportion of methacrylic acid in the interpolymer is increased, up to the limits herein disclosed, but these alterations in properties are not sufficiently marked to interfere with the practical use of the resins in most of the known applications of these resins as plastics whereas the increase in softening temperature is obviously of practical value. Furthermore, the present interpolymers, as compared with the polymerized simple esters, are not inferior in color, clarity, nor in surface hardness.

While the increase in softening temperature of these interpolymers necessitates the use of slightly higher temperatures for molding, the increase is not sufficient to make any important change in molding technique.

The advantages of the interpolymers of the present invention are, of course, most marked where an interpolymer having a softening temperature appreciably in excess of 100° C. is obtained as compared to a polymer of the methacrylate ester used in said interpolymer, having a softening temperature below 100° C. The resin having the softening temperature in excess of 100° C. is, naturally, adapted for use in the numerous articles which are exposed to boiling water in their normal use, whereas resins with lower softening temperatures are excluded from consideration for such uses.

As many apparently widely different embodiments of this invention may be made without departing from the spirit and scope thereof, it is to be understood that the invention is not limited to the specific embodiments thereof except as defined in the appended claims.

I claim:

1. Process of preparing interpolymers which comprises subjecting to polymerizing conditions a mixture containing, as the polymerizable components thereof, one part of methacrylic acid and 2–20 parts of a monohydric alcohol ester of methacrylic acid.

2. Process of preparing interpolymers which comprises subjecting to polymerizing conditions a mixture containing, as the polymerizable components thereof, one part of methacrylic acid and 4–9 parts of a monohydric alcohol ester of methacrylic acid.

3. Process of preparing interpolymers which comprises subjecting to polymerizing conditions a mixture containing, as the polymerizable components thereof, one part of methacrylic acid and 2–20 parts of methyl methacrylate.

4. Process of preparing interpolymers which comprises subjecting to polymerizing conditions a mixture containing, as the polymerizable components thereof, one part of methacrylic acid and 4–9 parts of methyl methacrylate.

5. Process of preparing interpolymers which comprises dispersing a mixture containing, as the polymerizable components thereof, one part of methacrylic acid and 2–20 parts of a monohydric alcohol ester of methacrylic acid, in an aqueous vehicle and subjecting the dispersion formed to polymerizing conditions.

6. Process of preparing interpolymers which comprises dispersing a mixture containing, as the polymerizable components thereof, one part of methacrylic acid and 2–20 parts of methyl methacrylate, in an aqueous vehicle and subjecting the dispersion formed to polymerizing conditions.

7. Process of preparing interpolymers which comprises dissolving a mixture containing, as the polymerizable components thereof, one part of methacrylic acid and 2–20 parts of a monohydric alcohol ester of methacrylic acid, in a liquid which is a solvent for the monomeric methacrylic acid and monomeric monohydric alcohol ester of methacrylic acid but is a non-solvent for an interpolymer of these substances, and subjecting the solution formed to polymerizing conditions.

8. An interpolymer consisting of one part of methacrylic acid with 2–20 parts of a monohydric alcohol ester of methacrylic acid.

9. An interpolymer consisting of one part of methacrylic acid with 4–9 parts of a monohydric alcohol ester of methacrylic acid.

10. An interpolymer consisting of one part of methacrylic acid with 2–20 parts of methyl methacrylate.

11. An interpolymer consisting of one part of methacrylic acid with 4–9 parts of methyl methacrylate.

12. An interpolymer obtained by polymerization of a mixture containing, as the polymerizable components thereof, one part of methacrylic acid with 2–20 parts of a monohydric alcohol ester of methacrylic acid.

LEO P. HUBBUCH.